United States Patent [19]
Street

[11] Patent Number: 5,831,258
[45] Date of Patent: Nov. 3, 1998

[54] PIXEL CIRCUIT WITH INTEGRATED AMPLIFER

[75] Inventor: Robert A. Street, Palo Alto, Calif.

[73] Assignee: Xerox Corporation, Stamford, Conn.

[21] Appl. No.: 699,875

[22] Filed: Aug. 20, 1996

[51] Int. Cl.⁶ .................................................. H01L 27/00
[52] U.S. Cl. .................................. 250/208.1; 250/214 A; 348/301; 348/308
[58] Field of Search ........................... 250/208.1, 214 R, 250/214 A; 257/292, 443; 348/300, 301, 305, 308; 330/308

[56] References Cited

U.S. PATENT DOCUMENTS

| | | | |
|---|---|---|---|
| 4,407,010 | 9/1983 | Baji et al. | 348/301 |
| 4,954,895 | 9/1990 | Akimoto et al. | 348/301 |
| 5,017,989 | 5/1991 | Street et al. | 357/30 |
| 5,262,649 | 11/1993 | Antonuk et al. | 250/370.09 |
| 5,539,461 | 7/1996 | Andoh et al. | 250/208.1 |

OTHER PUBLICATIONS

R. A. Street, S. Nelson, "Amorphous Silicon Sensor Arrays for Radiation Imaging", Mat. Res. Soc. Symp. Proc. vol. 192, pp. 441–462.

S. Kawai, T. Kodama, Y. Nasu, S. Yanagisawa and K. Asama, "A Self–Alignment Processed a Si:H TFT Matrix Circuit for LCD Panels", Processings of the SID, vol. 25/1, 1984, pp. 21–24.

J. Yorkston, L.E. Antonuk, E.J. Morton, J. Boudry, W. Huang, C.W. Kim, M.J. Longo, R.A. Street, "The Dynamic Response of Hydrogenated Amorphous Silicon Imaging Pixels", Mat. Res. Soc. Symp. Proc. vol. 219. ©1991 Materials Research Society, pp. 173–178.

L.E. Antonuk, J. Boudry, C.W. Kim, M. Longo, E.J. Morton, J. Yorkston, "Signal, noise, and readout considerations in the development of amorphous silicon photodiode arrays for radiotherapy and diagnostic x–ray imaging", SPIE vol. 1443 Medical Imaging V: Image Physics (1991), pp. 108–119.

*Primary Examiner*—Edward P. Westin
*Assistant Examiner*—Kevin Pyo

[57] ABSTRACT

The present invention relates to the use of a pixel design which incorporates an in-pixel amplifier to enhance the signal-to-noise ratio of an image sensor array while maintaining a high sensor fill factor. In addition, this pixel design allows for the addition of an amplifier without having to modify the fabrication process of current sensor arrays.

6 Claims, 6 Drawing Sheets

PIXEL CIRCUIT WITH INTEGRATED AMPLIFER

FIELD OF INVENTION

The present invention relates generally to image sensor arrays. More specifically, the invention relates to the use of a new pixel design which allows for the fabrication of high sensitivity sensor arrays.

BACKGROUND OF INVENTION

Two-dimensional large-area image sensor arrays have wide applications in medical imaging and optical scanning devices. Within the heart of a typical imaging or scanning device is an array of picture elements ("pixels"). Each pixel typically consists of a sensor and a pass transistor. The sensor is generally a reverse biased photodiode while the pass transistor is generally an amorphous silicon thin-film field effect transistor ("TFT"). A bias line supplies the required reverse biasing to the sensor, which is connected in series with the pass transistor, and is in turn connected to a data line. The gate electrode of the pass transistor is controlled by a gate line. Assuming that the bias lines run in the horizontal direction and the gate lines run in the vertical direction, all pixels along a given row are connected to the same data line while all gate electrodes of the pass transistors along a given column are connected to the same gate control line.

An image sensor is typically structured as a 2-dimensional array of rows and columns. The readout of an imge from the pixel array is achieved through a row decoder and a column decoder. The column decoder addresses one gate control line at a time while the row decoder addresses all of the data lines that are connected to the same gate control line. The data lines of the arrays are connected to charge sensitive readout amplifiers while the gate control lines of the array are connected to an external voltage switching circuitry which allows these lines to be independently held at either a positive or negative voltage. A typical image sensor array is described in "Amorphous Silicon Sensor Arrays for Radiation Imaging," Street et al., Mat. Res. Soc. Symp. Proc. Vol. 192, p.441 (1990).

During imaging, the gate lines are held at a bias which renders the pass transistors to be in their off-state. When light strikes the sensor array, charges which correspond to the intensity of the incident light are created and stored in the photodiode sensors.

During the readout cycle, a single gate line at a time is brought to a voltage which turns on all the pass transistors along that particular gate line, enabling the charges stored in pixels along that gate line to be simultaneously read out. After the signals have been read out, the gate line goes low, turning the pass transistors off. To read out the entire two-dimensional array to external electronics, this process is repeated by sequentially switching on, then off each successive gate line.

To improve the sensitivity or the dynamic range of a sensor array, it is important for a sensor array to have a high signal-to-noise ratio, which will enable relatively weak signals to be detected and measured. The ratio of the maximum signal ($q_{max}$) to the minimum signal ($q_{min}$) that can be measured by an array represents its dynamic range. For instance, a typical target dynamic range in medical imaging applications is 4000, i.e., the minimum signal ($q_{min}$) measurable should be at least 4000 times lower than the maximum signal ($q_{max}$). The electronic noise of an array is often a key limitation of the measurable minimal signal ($q_{min}$). If noise or any non-image related charge represents a significant fraction of the charge capacity of the pixels, the sensitivity and useful dynamic range of the array will be compromised.

A number of sources contribute to the level of noise of a sensor array. A dominant noise source is the readout amplifiers which are connected to the data lines. This noise stems from the input capacitance of the data lines into the readout amplifiers. The typical input capacitance of a data line ranges from 50 to 100 picofarads. At present, this noise source amounts to approximately 1000 to 2000 electrons for a high quality amplification. In contrast, the intrinsic source of noise associated with the array itself is typically on the order of a few hundred electrons. This noise stems from the thermal noise ("kTC" noise") of the transistor resistance and of the sensor capacitance.

In order to minimize the noise of a sensor array, substantial effort has been expended in reducing the capacitance of the array as well as in redesigning the readout amplifiers. However, since the dominant noise source which competes with the signal does not arise at the pixel level, but from the amplifiers and their input lines, an approach which improves the signal at the pixel level but without correspondingly increasing the noise associated with the readout electronics can enhance the sensitivity and dynamic range of a sensor array.

BRIEF SUMMARY OF INVENTION

The present invention provides a pixel design which produces a high signal-to-noise ratio in an image sensor array, thereby improving its sensitivity and dynamic range. This pixel design includes an in-pixel amplifier which amplifies the signal, but has minimal effect on the overall noise of a sensor array. Specifically, this pixel design includes an in-pixel single-transistor amplifier to increase the signal-to-noise ratio.

One advantage of the present invention is that it is a highly efficient design in many respects. This pixel design satisfies a number of competing demands through the use of a two-transistor circuit. It accomplishes amplification, readout, and reset of a pixel with minimal adverse impact on its size.

Another advantage of this pixel design is its high fill factor, which represents the fractional area of an array which is light sensitive. Generally, the addition of an amplifier reduces the pixel fill factor because it takes up valuable space that would otherwise be available to the sensor. However, because of the efficient pixel design, the present invention maintains a high fractional area in a pixel that is occupied by the sensor.

Yet another advantage is that the in-pixel amplifier is added without the expense of any additional gate or bias lines across the array. The present invention uses one gate line per pixel to achieve all readout and reset functions of an array. During a readout cycle, a single gate line performs both the readout of a pixel and the reset of the previously read pixel.

A further advantage of this invention is that the new pixel design is compatible with the current fabrication process for sensor arrays. Generally, the addition of an amplifier would require additional processing which deviates from a standard fabrication process. This design, however, can use the current manufacturing processes to form the in-pixel amplifier so that the manufacturability of the array is not sacrificed.

The advantages and objects of the present invention will become apparent to those skilled in the art from the follow-

DETAILED DESCRIPTION OF PREFERRED EMBODIMENTS

Figure 1:
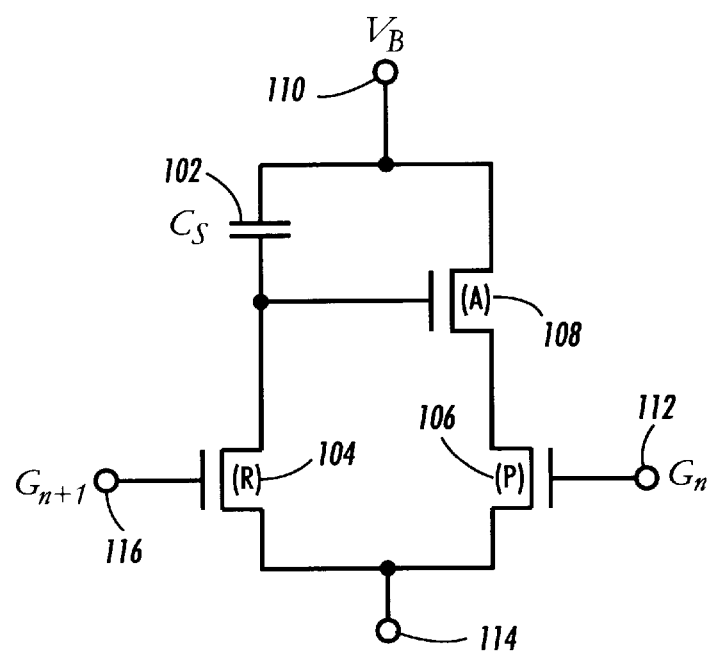
FIG. 1 shows the equivalent circuit of a pixel design in accordance with the present invention.

FIG. 1 illustrates the equivalent circuit of an embodiment of the present invention which uses an in-pixel single-transistor amplifier to enhance the signal-to-noise ratio of a sensor array. The single-transistor amplifier is a TFT, which is easily integrated into a pixel using current fabrication technology. Under this approach, each pixel consists of a sensor (S) 102, a reset transistor (R) 104, a pass transistor (P) 106, and a common source amplifier transistor (A) 108. The sensor 102 is an n-i-p amorphous silicon photodiode with an associated capacitance of $C_s$. The "n" and "p" refer to the n-doped and p-doped amorphous silicon layers respectively. Each doped layer is typically 10 to 100 nanometers in thickness. The "i" refers to an intrinsic amorphous silicon layer of approximately one to two microns ($\mu$m) in thickness. The p-doped region of the sensor 102 is connected to the bias line where a negative voltage ($V_B$) provides the reverse biasing necessary to operate the sensor 102. If a p-i-n photodiode is used under this embodiment, a positive voltage will be applied to the n-type region of the sensor instead.

As shown in FIG. 1, the output (Point X) of the sensor 102 drives the gate of the amplifier (A) 108, providing the desired amplification to the signal stored in the sensor 102. The pass transistor (P) 106 is connected in series with the amplifier (A) 108 so that when the gate line ($G_n$) 112 goes high, the pass transistor (P) 106 switches on, causing current to flow through the amplifier (A) 108 and the pass transistor (P) 106 to the data line 114. The current that flows through reflects the charge stored in the sensor 102. The reset transistor (R) 104 whose gate electrode is connected to the next gate line $G_{n+1}$ 116, resets the sensor 102 after a readout period.

The capacitance $C_s$ of the sensor 102 is typically on the order of picofarads. The bias voltage $V_B$ has a magnitude of a few volts. The charge (q) associated with the sensor 102 is the product of its capacitance $C_s$ and the voltage ($V_s$) across it. Typically, the product of $C_s$ and $V_B$, which is the maximum amount of charge ($q_{max}$) that the sensor 102 can store, is approximately one to five picocoulombs. For instance, if the product of $C_s$ and $V_B$ is one picofarad, $q_{max}$ is on the order of five million electrons. Assuming a target dynamic range of 4000, the desired detectable minimum signal ($q_{min}$) would be approximately 1250 electrons, which amounts to less than one femtocoulomb. Hence, in order to achieve the desired sensitivity and dynamic range, the minimum signal ($q_{min}$) detectable by the sensor should be at most on the order of 1250 electrons.

As discussed previously, the dominant noise source that competes with the signal does not arise at the pixel level, but from the amplifiers and their input data lines. The input capacitance of each data line is typically 50 to 100 picofarads, amounting to a noise level of approximately 1000 to 3000 electrons depending on the quality of the readout amplifiers and the associated electronics. On the other hand, the noise associated with the pixel capacitance is usually on the order of a few hundred electrons. Therefore, the amount of noise associated with the pixel capacitance is small relative to noise associated with readout electronics.

The in-pixel TFT amplifier, which is formed by the common source amplifier (A) 108 shown in FIG. 1, enhances the signal-to-noise ratio of an array because the amplification occurs at the pixel level. The noise associated with the readout electronics is not correspondingly amplified. Generally, the signal-to-noise ratio ("S/N") equals the signal of a pixel divided by the weighted sum of the noise at the pixel level and at the readout level:

$$S/N = \frac{\text{Signal}_{pixel}}{[(\text{Noise}_{pixel})^2 + (\text{Noise}_{readout})^2]^{1/2}} .$$

Assuming that the gain of the in-pixel amplifier is $G_{pixel}$, the signal to noise ratio is then as follows:

$$S/N = \frac{G_{pixel} \times \text{Signal}_{pixel}}{[(G_{pixel} \times \text{Noise}_{pixel})^2 + (\text{Noise}_{readout})^2]^{1/2}}$$

$$= \frac{\text{Signal}_{pixel}}{[(\text{Noise}_{pixel})^2 + (\text{Noise}_{readout}/G_{pixel})^2]^{1/2}} .$$

The above equations show that the gain suppresses the contribution of the readout noise in the signal to noise ratio. However, when $G_{pixel}$ becomes so large such that ($\text{Noise}_{readout}/G_{pixel}$) is much smaller than $\text{Noise}_{pixel}$, the pixel noise dominates and further improvement on the signal to noise ratio is minimal.

As an example, assuming that $\text{Noise}_{pixel}$=200 electrons, $\text{Noise}_{readout}$=2000 electrons, and the gain of the TFT amplifier is 10, the signal as well as the noise at the pixel level are amplified ten times. The noise at the pixel increases ten-fold from 200 electrons to 2000 electrons while the dominant noise associated with the amplifier only increases 1.4 times. In other words, a ten-fold increase in the noise at the pixel level does not amount to a ten-fold increase in the total noise. The breakeven point generally occurs when the gain in the signal is correspondingly offset by the increase in the total noise. In the above example, the breakeven point happens when the amplification is so large that the pixel noise dominates, i.e., (Gain×200)>2000

The above calculations also show that the present invention does not require an amplifier with significant gain. In fact, in the above example, there is no further advantage if the gain at the pixel level is much larger than ten.

Figure 2:
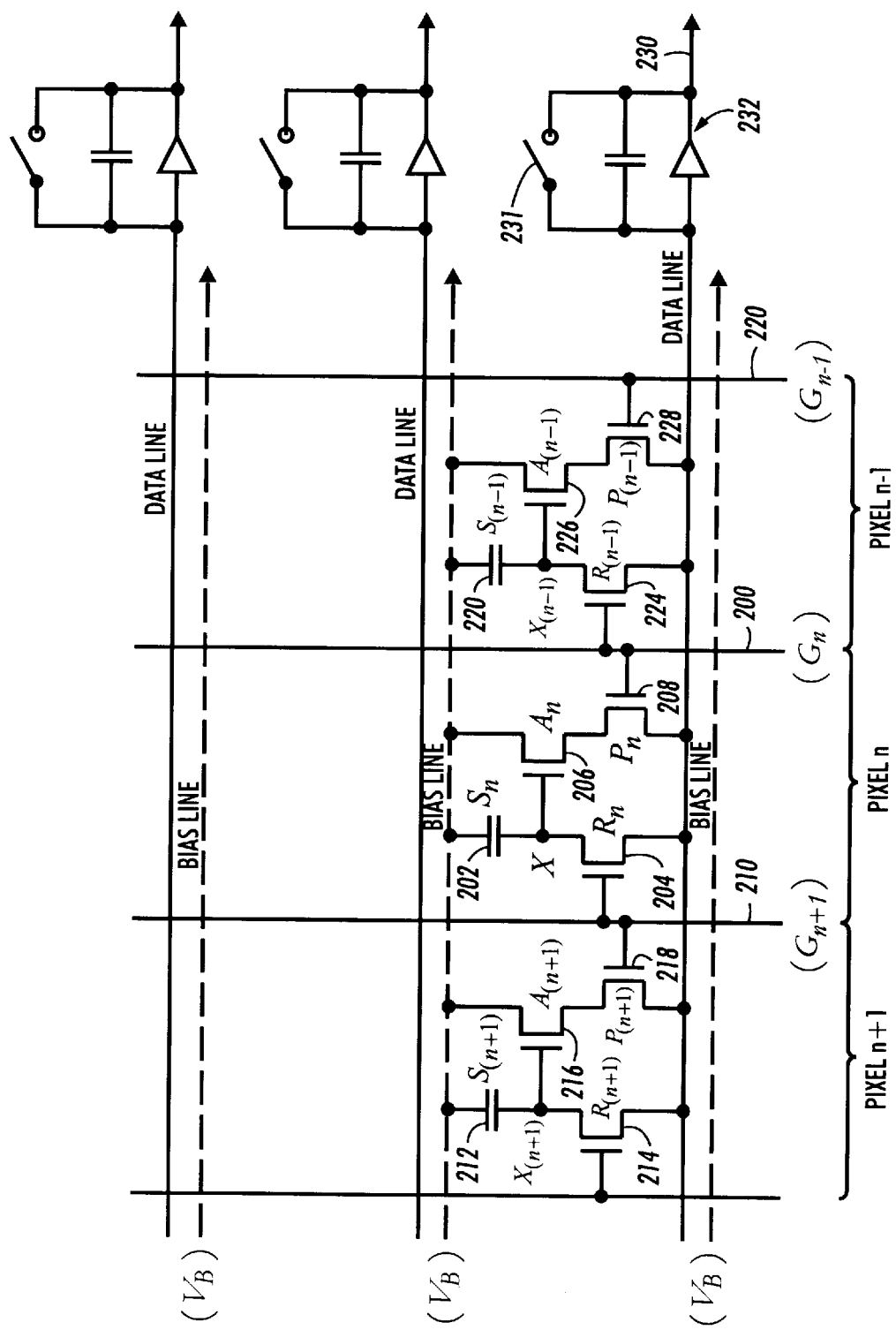
FIG. 2 shows a schematic diagram of an image sensor array in accordance with the present invention.

FIG. 2 illustrates a schematic diagram of an image sensor array in accordance with the present invention. As shown in FIG. 2, each gate line reads all of the pixels along a given column while each data line carries the signal of all pixels along a given row. The gate lines are connected to external voltage switching circuitry which allows a positive or negative bias voltage be applied to each line. The data lines are connected to charge sensitive readout integrators 232. Voltage amplifiers can also be used.

When light strikes sensor $S_n$ 202, the voltage at the output of the sensor (Point X) increases towards the bias voltage ($V_B$). Once Point X reaches $V_B$, the capacitor $C_s$ associated with the sensor 102 saturates. The voltage at Point X varies from being close to zero volt when there is no illumination, up to approximately $V_B$, when the sensor is saturated.

During imaging, all gate lines are held low, rendering all transistors in the array to be in their off-state. When light strikes sensor $S_n$ 202, a charge is created and stored, raising the voltage at Point X to $V_x$. After imaging, to read out the charge that has been stored in sensor $S_n$ 202, gate line $G_n$ 200 is brought high. Assuming the threshold voltage of transistor $A_n$ 206 is zero, when gate line $G_n$ goes high, both the amplifier transistor $A_n$ 206 and the pass transistor $P_n$ 208 switch on, allowing current to flow to the data line 230. The current that flows in the data line 230 depends upon the voltage at Point X and is integrated for a selected time by the external integrator 232.

To read out pixel n+1, gate line $G_{n+1}$ 210 goes high so that the charge stored in sensor $S_{(n+1)}$ 212 is read out. When gate line $G_{n+1}$ 210 goes high, in addition to turning on the pass transistor $P_{n+1}$, the reset transistor $R_n$ 204 of the pixel previously read also turns on, resetting the sensor $S_n$ 202. In other words, the gate line $G_{n+1}$ 210 is used to read out pixel n+1 and to reset the pixel previously read.

Figure 3:
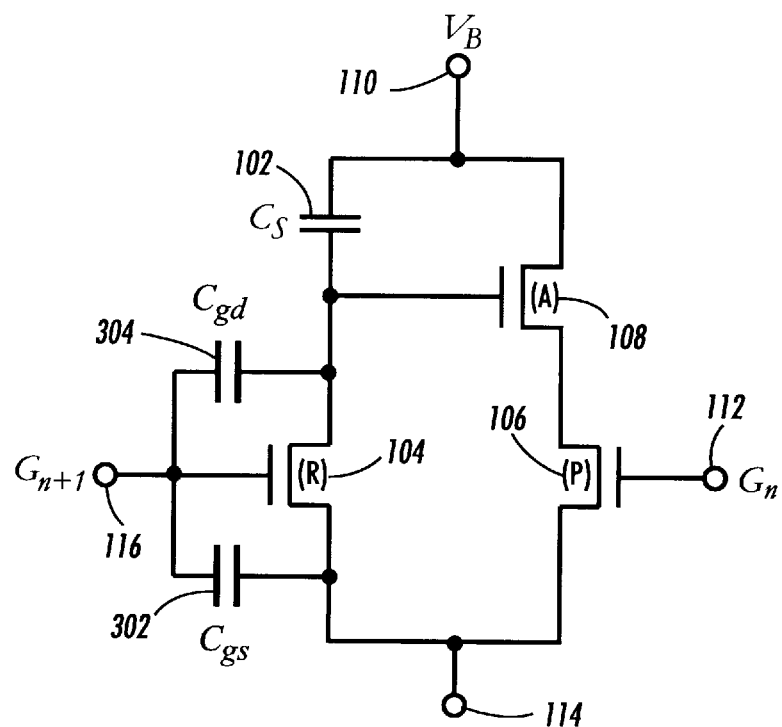
FIG. 3 shows the equivalent circuit of a pixel design in which the feedthrough capacitances of a reset transistor are shown.

FIG. 3 shows an equivalent circuit of a pixel in which the feedthrough capacitances of the reset transistor (R) 104 are shown. As shown in FIG. 3, parasitic capacitance ($C_{gs}$) 302 exists across the source and gate region and parasitic capacitance ($C_{gd}$) 304 exists across the drain and gate region of the reset transistor (R) 104. Because of these parasitic capacitances, when gate line $G_{n+1}$ 116 goes high, the reset transistor (R) 104 is not reset to exactly ground. The voltage across the source and drain contacts of the reset transistor (R) 104 is $V_R$, which is commonly referred to as the reset voltage. After the charge has been transferred out of the sensor 102 and $G_{n+1}$ goes low, the feedthrough charge typically causes point X to reset to the $V_R$ of approximately −0.5 volts.

Figure 4:
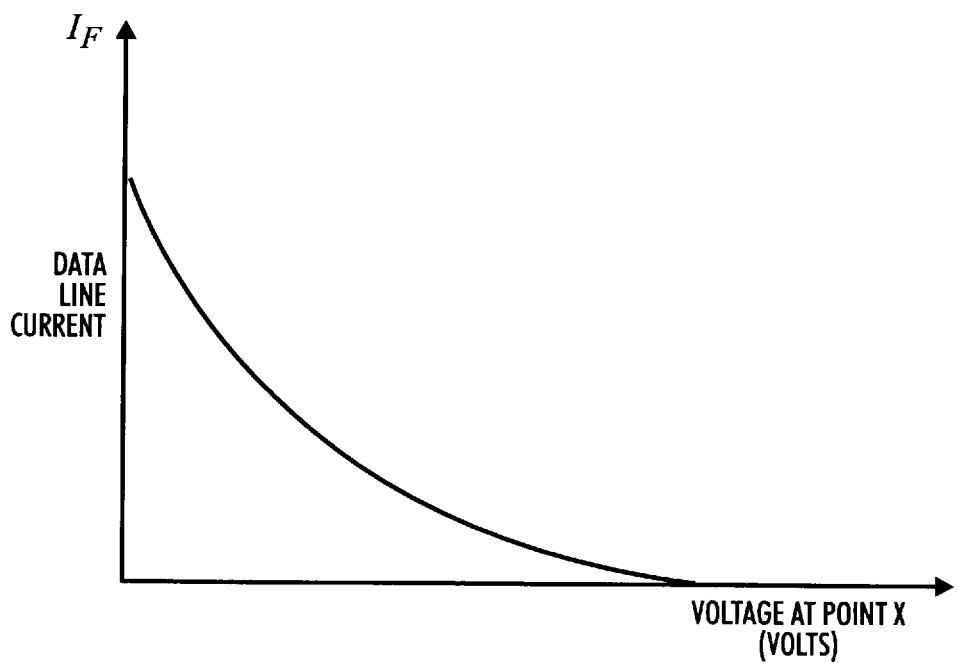
FIG. 4 shows the relationship of the voltage at the output (Point X) of the sensor in a pixel versus the current in the data line.

FIG. 4 illustrates the relationship of voltage at point X versus the current ($I_F$) through data line 114 of FIG. 3. During the readout cycle, the amplifier (A) 108 in FIG. 3 is generally operating in its saturation regime since its gate voltage $V_G$ is lower than its drain voltage $V_D$. Assuming the amplifier (A) 108 has a threshold voltage of zero volts, the current through amplifier (A) 108 is governed by the following equation:

$$I_F = C_G \mu (Q_s - Q_{sat})^2 / C_s^2 \, W/(2L),$$

where $C_G$ is the channel capacitance of the amplifier (A) 108, $\mu$ is is the carrier mobility, W is the width, L is the length, $Q_s$ is the amount of charge stored in the sensor, and $Q_{sat}$ is the saturation charge.

As an example, a sensor capacitance of one picofarad, which is typical of a pixel size of 100 to 150 $\mu m^2$, a W/L ratio of four, a gate voltage of 5 volts, and a gate capacitance of $5 \times 10^{-8}$ Farads/cm$^2$ are assumed. In addition, the capacitance associated with the gate electrode of the amplifier (A) 108 and the parasitic capacitances associated with the reset (R) 104 and the amplifier (A) 108 are assumed to be negligible. For the parameters assumed, when $Q_s$ equals zero, the current ($I_F$) is about 2.5 $\mu$A, which yields a total output charge of 50 picocoulombs if the integration time is approximately 20 $\mu$seconds. Compared with a typical $q_{max}$ of 5 picocoulombs, the output charge represents a gain of about 10, which should dramatically improve the performance of an amorphous silicon imager. Depending upon the design of the transistors, the on-resistance of the reset transistor (R) 104 and pass transistor (P) 106 in the saturation region is typically about 1 M$\Omega$.

As shown in FIG. 3, the relationship between the voltage at point X and the current ($I_F$) through data line 114 of FIG. 3 is monotonic and non-linear. Furthermore, the signal is inverted. When the signal is large, the current $I_F$ on the data line 114 is low. The inversion of a signal is generally not an issue in sensor array design since software gain and offset corrections are routinely performed on the signal. Furthermore, the signal can be made more linear at the expense of extra complexity with respect to the pixel design. If a higher source bias is applied to the amplifier (A) 108, the relative change in the gate-source voltage is reduced and the response is more linear. This could be achieved by adding a second bias line, which allows for the application of a different bias voltage to the sensor 102 and the amplifier (A) 108. However, the non-linearity may not even be an issue in some applications. For example, linearity is generally not important in x-ray photon counters.

Figure 5:
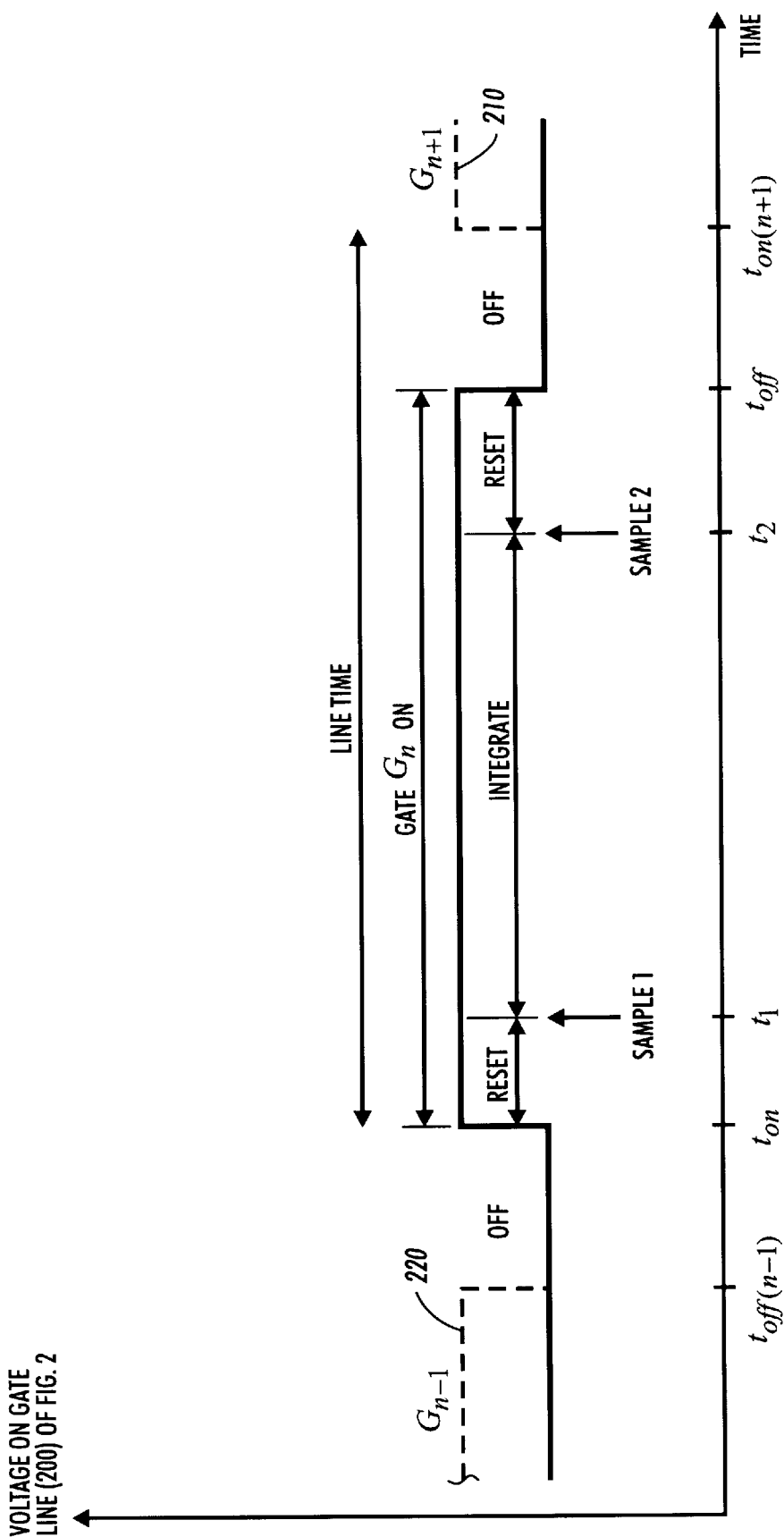
FIG. 5 shows a possible timing diagram of a readout cycle of an array.

FIG. 5 shows a possible timing diagram for a readout cycle of an array shown in FIG. 2. It shows the magnitude of the voltage on a gate line $G_n$ 200 versus time. The time it takes to read a gate line is generally referred to as the "line time," which is on the order of 30 to 100 microseconds. The time it takes to perform a complete readout of all the gate lines is referred to as the "frame time," which ranges from milliseconds to seconds. The RC time constant of the readout electronics in present arrays is typically two to five microseconds.

The readout process generally uses a double correlated sampling technique, which includes two sequential measurements to remove any extraneous signals. Prior to reading pixel n in FIG. 2, the previous pixel (n−1) was read out, after which all gate lines remain off during the time period from $t_{OFF(n-1)}$ to $t_{ON}$. After gate line $G_n$ 200 goes high at $t_{ON}$, the first measurement is taken at $t_1$, after the pixel previously read has been properly reset. During the period $t_{ON}$ to $t_1$, the voltage of data line 230 of FIG. 2 is held at ground and the integrator 232 is disabled by closing the feedback switch 231 shown in FIG. 2. The initial reset period typically lasts five microseconds. At $t_1$, the integrator 232 is then activated by opening the feedback switch 231, at which time the first measurement is taken. At the end of the integration time at $t_2$, the second measurement is taken before the feedback switch 231 is closed again. The difference between the two measurements is recorded. Sampling capacitors which store the two measurements are not shown in the figures. They are generally part of the external integrators 232 shown in FIG. 2. Under this measuring technique, any extraneous signal is subtracted out. After the second measurement has been taken at $t_2$, the gate line $G_n$ 200 may remain high until $t_{OFF}$ so that the output (Point $X_{n-1}$) of the sensor ($S_{n-1}$) 220 may be reset to a different voltage. Lastly, when gate $G_n$ 200 goes low at $t_{OFF}$, the next gate line $G_{n+1}$ 210 then turns on at $t_{ON(n+1)}$, at which time the readout cycle is repeated.

Figure 6:
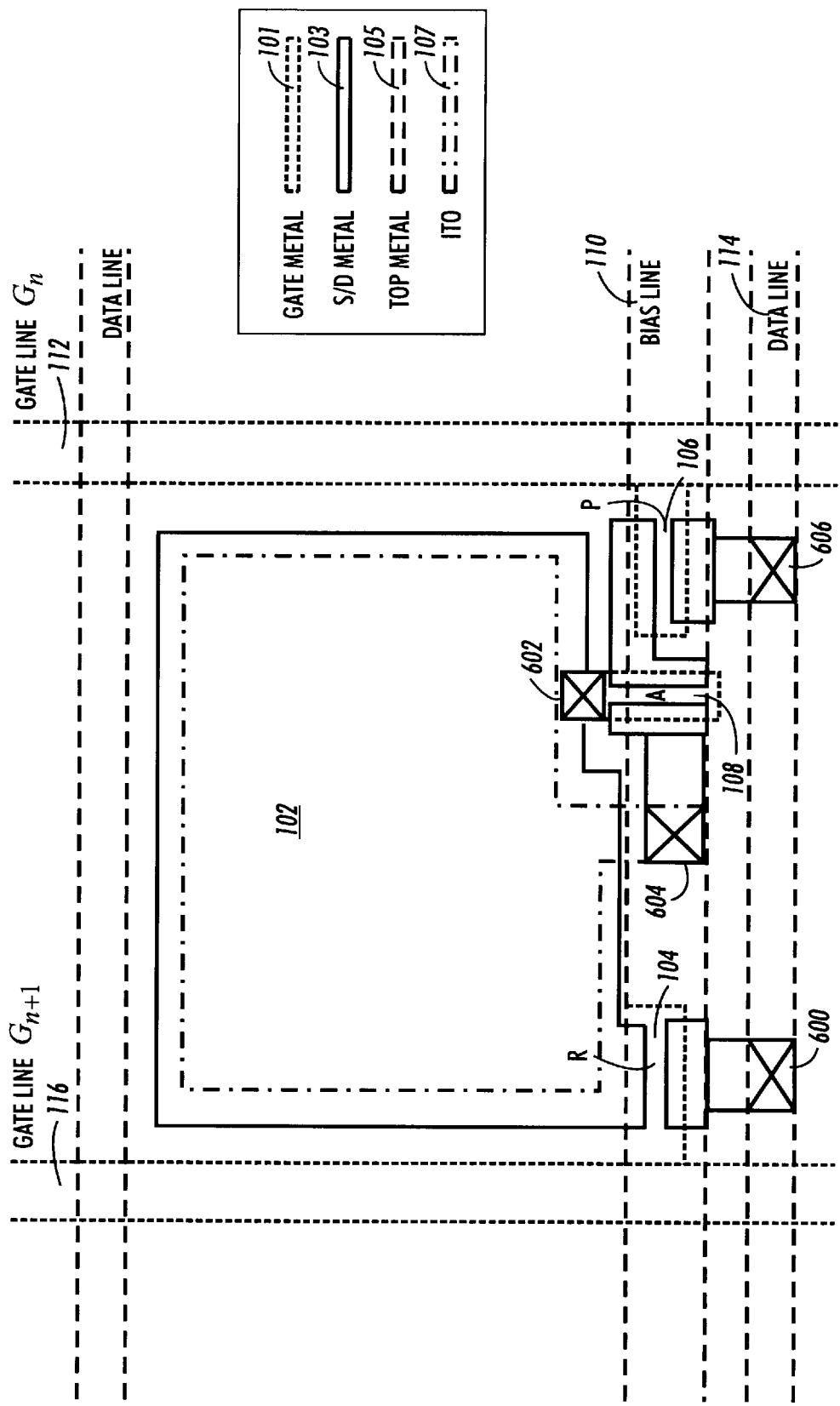
FIG. 6 shows a layout of a pixel design in accordance with the present invention.

FIG. 6 shows a pixel layout of the present invention, which can be created by utilizing current fabrication processes for amorphous silicon sensor arrays. Current fabrication processes typically uses three metal layers to form the interconnect lines and an additional transparent metallic film to provide the top contact to the sensor. The interconnect layer which forms the gate electrodes of the TFT's is the "gate metal" layer 101. Above the gate metal layer 101, there is another metal layer 103 which forms the electrodes of the source and drain regions of the TFT's. This metal layer is commonly referred to as the source/drain metal or the "S/D metal." Above the S/D metal layer 103, there are two additional metal layers commonly referred to as the "top metal" 105 and the "InSnO" or "ITO" layer 107 respectively.

As shown in FIG. 6, the gate electrodes of the reset transistor (R) 104, the amplifier transistor (A) 108, and the pass transistor (P) 106 are formed by the gate metal layer 101 and are covered by the bias line ($V_B$) 110 formed using the top metal layer 105. The bias line 110 shields the gate electrodes of the transistors from illumination. In this embodiment, gate line $G_{n+1}$ 116 is connected to the gate of the reset transistor (R) 104 whereas gate line $G_n$ 112 is connected to the gate of the pass transistor (P) 106. The pixel pitch is typically 100 to 500 $\mu$m.

The gate electrode of the amplifier transistor (A) 102 is connected to the bottom electrode of the sensor 102 through a via 602. The gate electrode of the amplifier 102 is formed by the gate metal layer 101 while the bottom electrode of the sensor 102 is formed by the S/D metal layer 103. The via 602 provides a short circuit between the gate metal layer 101 and the S/D metal layer 103.

The bottom electrode of the sensor 102 also forms the source region of the reset transistor (R) 104 as shown in FIG. 6. On the other hand, the drain region of the reset transistor (R) 104, which is formed by the S/D metal layer 103, is connected to the data line 114 through a via 600. The via 600 connects the S/D metal layer 103 and the top metal layer 105.

Through another via 606, the data line 114 is connected to the drain of the pass transistor (P) 106. The via, 606, is similar to the via 600 in that both connect the S/D metal layer 103 to the top metal layer 105. Also, as shown in FIG. 6, the portion of the S/D metal layer 103 which forms the source of the pass transistor (P) 106 also forms the drain of the amplifier (A) 108.

The source region of the amplifier (A) 108 is connected to the top electrode of the sensor 102 through a via 604. The source of the amplifier 108 is formed by the S/D metal layer 103 whereas the top electrode of the sensor 102 is formed by the ITO metal layer 107. The via 604 in addition to providing a short circuit between the source of the amplifier (A) 108 and the top electrode of the sensor 102, also provides a short circuit to the bias line ($V_B$) 110.

The efficiency of this design is clearly demonstrated by the layout shown in FIG. 6. Normal pixel has a sensor and a pass transistor (P). Under the new design, there are only two additional transistors—the pass transistor 106 and the amplifier 108—to achieve in-pixel amplification.

As shown by FIG. 6, the sensor 102 may occupy over 50 percent of the area of a 150 $\mu$m$^2$ pixel, which represents a reasonable sensor fill factor. Generally, the larger the pixel size, the higher the fill factor can be achieved. If the array is made with a sensor layer above the TFT's, then a smaller pixel size or more complex circuit could be included.

Figure 7:
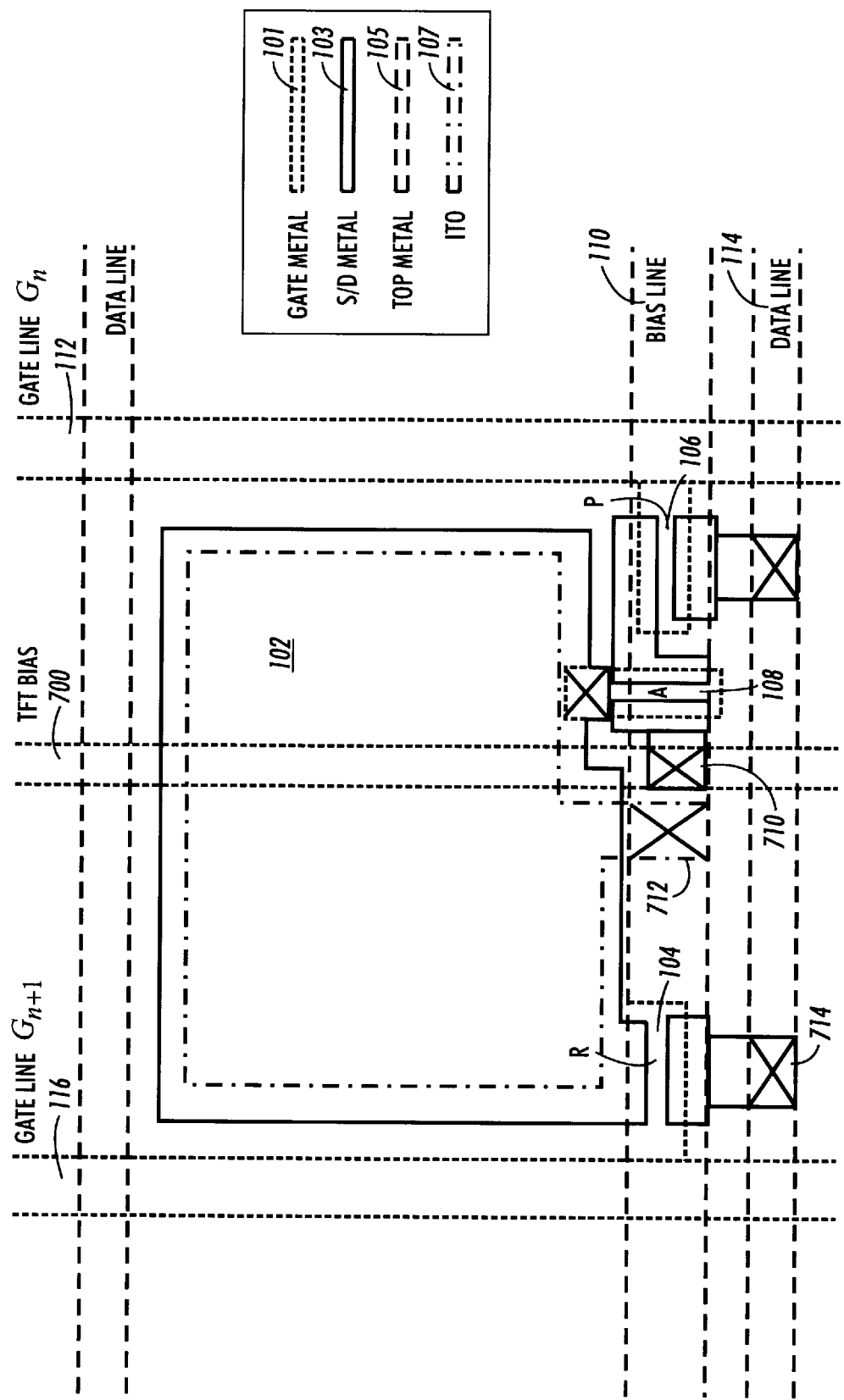
FIG. 7 shows another layout of a pixel design, which includes an additional bias line for each column of pixels.

FIG. 7 shows an alternative embodiment of the present invention in which a second bias line 700 is used. This second bias line is formed by the gate metal layer 101. Under this approach the source of the amplifier (A) 108 can be biased separately from the bias to the sensor 102. In addition, a lower bias such as −2 volts, combined with resetting the output point of the sensor to +5 volts provides better linearity with no loss of fill factor.

Under this approach, an additional via 710 is required to provide the second bias. The source region of the amplifier (A) 108 is connected to the second bias line 700 through a via 710. The via 710 connects the S/D metal layer 103 to the gate metal layer 101. Unlike the via 604, in FIG. 6, the via 712 only connects the top electrode of the sensor 102 to the bias line 110. The via 714 is functionally equivalent to the via 600 shown in FIG. 6.

While the invention has been described in conjunction with specific embodiments, it is evident to those skilled in the art that many alternatives, modifications, and variations will be apparent in light of the foregoing description. Accordingly, the invention is intended to embrace all such alternatives, modifications, and variations that fall within the spirit and scope of the appended claims.

What is claimed is:

1. A pixel amplifier circuit including a plurality of devices on a shared substrate, comprising:
   a first gate line;
   a second gate line;
   a data line;
   a bias line;
   a photosensor having first and second contacts;
   an amplifier transistor, having a source contact connected to said first contact of said photosensor, a gate contact connected to said second contact of said photosensor, and a drain contact;
   a thin film pass transistor having a source contact connected to said drain contact of said amplifier transistor, a gate contact connected to said first gate line, and a drain contact connected to said data line; and
   a thin film reset transistor having a source contact connected to said data line, a gate contact connected to said second gate line, and a drain contact connected to said second contact of said photosensor.

2. The pixel amplifier circuit of claim 1, wherein said first contact of said photosensor and said source contact of said amplifier transistor are connected to said bias line.

3. The pixel amplifier circuit of claim 1, located adjacent a second pixel amplifier circuit, wherein said second pixel amplifier circuit includes a pass transistor having a gate contact connected to said second gate line.

4. An image sensing apparatus of the type including a data line, bias line, and a plurality of gate lines, comprising:
   a first pixel circuit, comprising:
      a first-pixel photosensor having first and second contacts;
      a first-pixel amplifier transistor having a source contact connected to said first contact of said first-pixel photosensor, a gate contact connected to said second contact of said first-pixel photosensor, and a drain contact;
      a first-pixel pass transistor having a source contact connected to said drain contact of said first-pixel amplifier transistor, a gate contact connected to a first gate line, and a drain contact connected to said data line; and
      a first-pixel reset transistor having a source contact connected to said data line, a gate contact connected to a second gate line, and a drain contact connected to said second contact of said first-pixel photosensor; and a second pixel circuit, comprising:
- a second-pixel photosensor having first and second contacts;
- a second-pixel amplifier transistor having a source contact connected to said first contact of said second-pixel photosensor, a gate contact connected to said second contact of said second-pixel photosensor, and a drain contact;
- a second-pixel pass transistor having a source contact connected to said drain contact of said second-pixel amplifier transistor, a gate contact connected to said second gate line, and a drain contact connected to said data line; and
- a second-pixel reset transistor having a source contact connected to said data line, a gate contact connected to a third gate line, and a drain contact connected to said second contact of said second-pixel photosensor.

5. The image sensing apparatus of claim 4, wherein said first contact of each of said first-pixel and second-pixel photosensors, and said source contacts of each of said first-pixel and second-pixel amplifier transistors are connected to said bias line.

6. The image sensing apparatus of claim 4, wherein said gate contact of said first-pixel reset transistor is connected to said gate contact of said second-pixel pass transistor via said second gate line.

* * * * *